United States Patent
Weston et al.

(10) Patent No.: US 11,995,491 B1
(45) Date of Patent: May 28, 2024

(54) CONTROL OF VEHICLE WITH DOOR DETACHED

(71) Applicant: Ford Global Technologies, LLC, Dearborn, MI (US)

(72) Inventors: Keith Weston, Canton, MI (US); Andrew Denis Lewandowski, Sterling Heights, MI (US); Brendan Francis Diamond, Grosse Pointe, MI (US); Victor Martinez, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 18/156,516

(22) Filed: Jan. 19, 2023

(51) Int. Cl.
*G06K 19/07* (2006.01)
*B60R 25/01* (2013.01)
*B60R 25/34* (2013.01)
*G06K 7/10* (2006.01)
*G06T 7/70* (2017.01)

(52) U.S. Cl.
CPC .......... *G06K 19/0723* (2013.01); *B60R 25/01* (2013.01); *B60R 25/34* (2013.01); *G06K 7/10366* (2013.01); *G06T 7/70* (2017.01)

(58) Field of Classification Search
CPC ............ G06K 19/0723; G06K 7/10366; B60R 25/01; B60R 25/34; G06T 7/70
See application file for complete search history.

(56) References Cited

U.S. PATENT DOCUMENTS

| 7,050,897 | B2 | 5/2006 | Breed et al. |
| 8,451,110 | B2 | 5/2013 | Takeshita |
| 10,416,671 | B2 | 9/2019 | Herbach |
| 11,807,084 | B1* | 11/2023 | Kondrad ................. B60J 5/0479 |
| 2007/0132273 | A1* | 6/2007 | Suzuki .................. E05F 15/632 296/155 |
| 2008/0180231 | A1* | 7/2008 | Chen ...................... B60R 25/24 340/426.14 |
| 2019/0256037 | A1* | 8/2019 | Ghannam ........... B60R 21/0428 |
| 2021/0206343 | A1 | 7/2021 | Welk et al. |
| 2021/0230921 | A1* | 7/2021 | Battlogg ............. B60R 21/0136 |

(Continued)

FOREIGN PATENT DOCUMENTS

EP   3795430 A1   3/2021

OTHER PUBLICATIONS

Kashevnik, A. et al., "Seat Belt Fastness Detection Based on Image Analysis from Vehicle In-Cabin Camera," Proceeding of the 26th Conference of FRUCT Association, 2020, 8 pages.

*Primary Examiner* — Mohamed Barakat
(74) *Attorney, Agent, or Firm* — Frank Lollo; Bejin Bieneman PLC

(57) ABSTRACT

A computer includes a processor and a memory, the memory storing instructions executable by the processor to determine that a door of a vehicle is attached to the vehicle based on data from at least one of a camera of the vehicle or a radio receiver of the vehicle; upon determining that the door is attached to the vehicle, actuate a component of the vehicle based on data from a door sensor of the vehicle, the door sensor indicating whether the door is open or closed; determine that the door is detached from the vehicle based on the data from the at least one of the camera or the radio receiver; and upon determining that the door is detached from the vehicle, actuate the component without relying on the data from the door sensor.

20 Claims, 4 Drawing Sheets

(56) References Cited

U.S. PATENT DOCUMENTS

| | | |
|---|---|---|
| 2021/0284090 A1 | 9/2021 | Tejeda et al. |
| 2021/0291786 A1* | 9/2021 | Cisneros ................. B60R 25/01 |
| 2022/0017043 A1* | 1/2022 | Breynaert ............... B60R 25/01 |

* cited by examiner

CONTROL OF VEHICLE WITH DOOR DETACHED

BACKGROUND

Vehicles typically include doors. The doors can be opened to allow occupants to enter and exit the vehicle. Some functionality of a vehicle can depend on whether the doors are open or closed. Some vehicles have a chime and warning light that activate when the door is opened while the vehicle is running.

DETAILED DESCRIPTION

Figure 1:
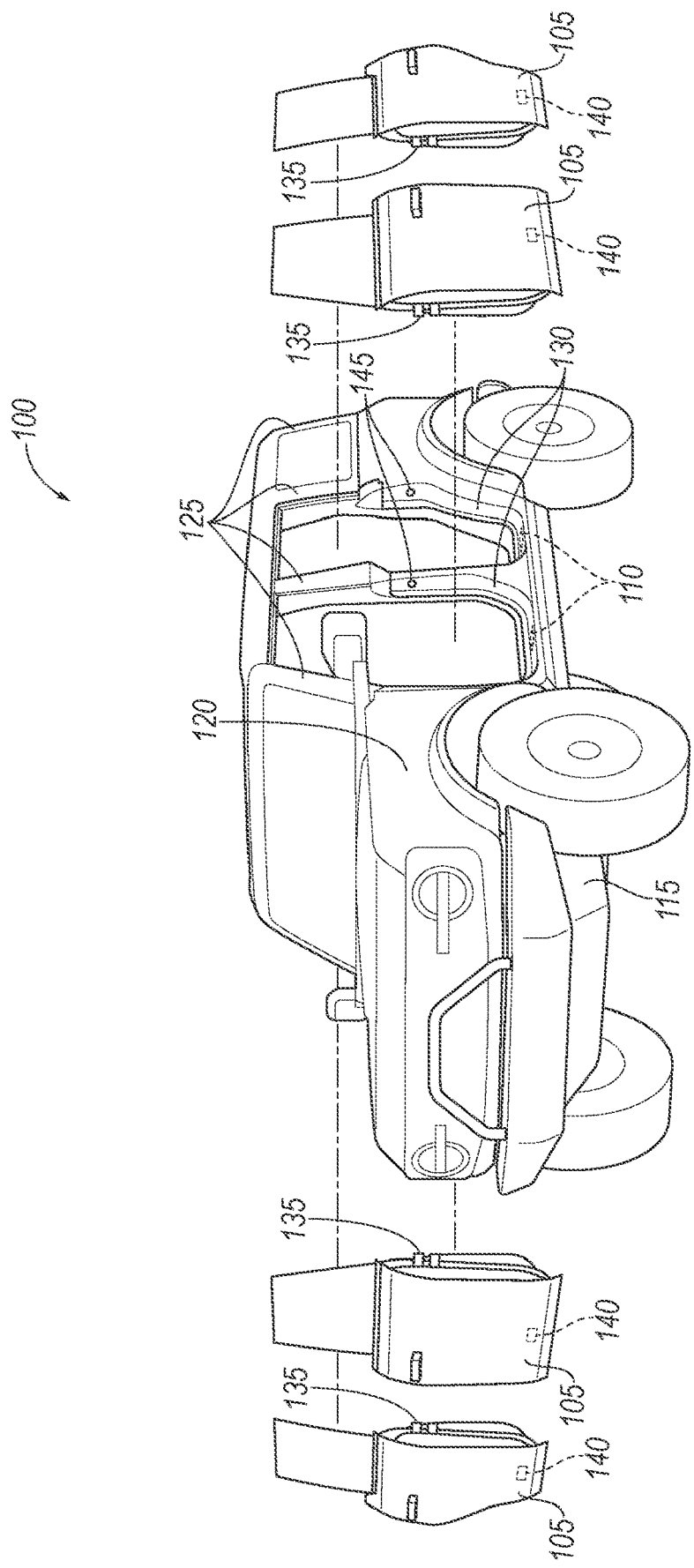
FIG. 1 is a perspective view of an example vehicle with doors detached.

This disclosure describes techniques for changing the operation of components of a vehicle depending on whether the doors of the vehicle are attached or detached. Some components of the vehicle may actuate depending on whether the doors are open or closed, e.g., a seatbelt indicator, i.e., a dashboard light or output indicating that one of the seatbelts of the vehicle has been unbuckled. A door sensor may output data indicating whether the door is open or closed. The seatbelt indicator may reset, e.g., turn off if it has been actuated, based on data from the door sensor, e.g., upon the opening of one of the doors.

However, the doors of the vehicle may be removable by the owner or operator of the vehicle, so the status of the doors as open or closed may be inapplicable, e.g., the event of opening the door may not occur. As described herein, a computer of the vehicle is programmed to determine whether a door is attached or detached; upon determining that the door is attached to the vehicle, actuate a component of the vehicle based on data from a door sensor of the vehicle; and upon determining that the door is detached from the vehicle, actuate the component without relying on the data from the door sensor. The component may thus still use the status of the door as open or closed when that status is applicable.

The computer determines whether the door is attached or detached based on data from at least one of a camera of the vehicle or a radio receiver of the vehicle. The camera may also be used for monitoring occupants of the vehicle, meaning that the status of the door can be determined without additional hardware. The radio receiver may detect a presence or absence of a radio frequency identification (RFID) tag located in the door. The radio receiver provides a simple and effective way to track the status of the door.

A computer includes a processor and a memory, the memory storing instructions executable by the processor to determine that a door of a vehicle is attached to the vehicle based on data from at least one of a camera of the vehicle or a radio receiver of the vehicle; upon determining that the door is attached to the vehicle, actuate a component of the vehicle based on data from a door sensor of the vehicle, the door sensor indicating whether the door is open or closed; determine that the door is detached from the vehicle based on the data from the at least one of the camera or the radio receiver; and upon determining that the door is detached from the vehicle, actuate the component without relying on the data from the door sensor.

In an example, the instructions may further include instructions to determine that the door is attached to the vehicle based on data from the camera, and determine that the door is detached based on data from the camera.

In an example, the instructions may further include instructions to determine that the door is attached to the vehicle based on data from the radio receiver, and determine that the door is detached based on data from the radio receiver. In a further example, the radio receiver may be a radio frequency identification (RFID) reader. In a yet further example, the instructions may further include instructions to determine that the door is attached to the vehicle in response to data from the RFID reader indicating a presence of an RFID tag of the door, and determine that the door is detached from the vehicle in response to data from the RFID reader indicating an absence of the RFID tag.

In an example, the component may be a seatbelt indicator. In a further example, the instructions may further include instructions to, upon determining that the door is attached to the vehicle, actuate the seatbelt indicator in response to data indicating a seatbelt of the vehicle being unbuckled.

In another further example, the instructions may further include instructions to, upon determining that the door is attached to the vehicle, de-actuate the seatbelt indicator in response to data from the door sensor indicating that the door is open.

In another further example, the instructions may further include instructions to, upon determining that the door is detached from the vehicle, actuate the seatbelt indicator in response to data indicating a seatbelt of the vehicle being unbuckled.

In another further example, the instructions may further include instructions to, upon determining that the door is detached from the vehicle, actuate the seatbelt indicator in response to data indicating a seatbelt of the vehicle being unbuckled and data indicating an occupant in a seat paired with the seatbelt. In a yet further example, the instructions may further include instructions to, upon determining that the door is detached from the vehicle, keep the seatbelt indicator actuated until receiving data indicating a lack of the occupant in the seat.

In another further example, the instructions may further include instructions to, upon determining that the door is detached from the vehicle, de-actuate the seatbelt indicator in response to data indicating a lack of an occupant in a seat.

In another further example, the instructions may further include instructions to de-actuate the seatbelt indicator in response to the vehicle turning off.

In an example, the instructions may further include instructions to, upon determining that the door is detached from the vehicle, actuate the component based on data indicating an occupancy status of the vehicle. In a further example, the instructions may further include instructions to receive the data indicating the occupancy status from a weight sensor in a seat of the vehicle.

In another further example, the instructions may further include instructions to receive the data indicating the occupancy status from at least one of the camera or a radar of the vehicle.

In an example, the instructions may further include instructions to, upon determining that the door is detached from the vehicle, actuate the component based on data from at least one of the camera or a radar of the vehicle. In a further example, the instructions may further include instructions to, upon determining that the door is detached from the vehicle, actuate the component based on data from the camera.

In another further example, the instructions further include instructions to, upon determining that the door is detached from the vehicle, actuate the component based on data from the radar.

A method includes determining that a door of a vehicle is attached to the vehicle based on data from at least one of a camera of the vehicle or a radio receiver of the vehicle; upon determining that the door is attached to the vehicle, actuating a component of the vehicle based on data from a door sensor of the vehicle, the door sensor indicating whether the door is open or closed; determining that the door is detached from the vehicle based on the data from the at least one of the camera or the radio receiver; and upon determining that the door is detached from the vehicle, actuating the component without relying on the data from the door sensor.

With reference to the Figures, wherein like numerals indicate like parts throughout the several views, a computer 305 includes a processor and a memory, the memory storing instructions executable by the processor to determine that a door 105 of a vehicle 100 is attached to the vehicle 100 based on data from at least one of a camera 205 of the vehicle 100 or a radio receiver 110 of the vehicle 100; upon determining that the door 105 is attached to the vehicle 100, actuate a component of the vehicle 100 based on data from a door sensor 145 of the vehicle 100, the door sensor 145 indicating whether the door 105 is open or closed; determine that the door 105 is detached from the vehicle 100 based on the data from the at least one of the camera 205 or the radio receiver 110; and upon determining that the door 105 is detached from the vehicle 100, actuate the component without relying on the data from the door sensor 145.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a frame 115 and/or a body 120. The vehicle 100 may be of a unibody construction, in which the frame 115 and the body 120 of the vehicle 100 are a single component. The vehicle 100 may, alternatively, be of a body-on-frame construction, in which the frame 115 supports the body 120 that is a separate component from the frame 115. The frame 115 and body 120 may be formed of any suitable material, for example, steel, aluminum, etc. The frame 115 and/or body 120 of the vehicle 100 may include a plurality of pillars 125 extending generally vertically from a base or lower portion of the frame 115 to a roof of the frame 115.

The vehicle 100 includes a plurality of the doors 105 and respective door openings 130. The door openings 130 are designed to each receive one of the doors 105. The doors 105 may be removable. For the purposes of this disclosure, "removable" as applied to the doors 105, is defined as detachable in a manner using only nonspecialty tools, i.e., tools marketed to consumers rather than automotive repair specialists, and in a manner allowing for reattachment. The door opening 130 and/or the door 105 may be designed such that the doors 105 are "removable." For example, the door opening 130 and/or the door 105 may include hinges 135 that are designed to be disengaged and re-engaged by a consumer, e.g., an owner of the vehicle 100, such that the vehicle 100 may be operated either with or without the doors 105 in the door openings 130, i.e., with the doors 105 attached to or detached from the vehicle 100. The vehicle 100 is designed to be operated with or without the doors 105 in the door openings 130.

The body 120 of the vehicle 100 may define the door openings 130. The door openings 130 may include front-row door openings 130 and second-row door openings 130. For example, the pillars 125 may partially define the door openings 130. The front-row door openings 130, i.e., that are frontmost in the vehicle 100, may be defined by the front pillars 125 and the middle pillars 125. The second-row door openings 130, i.e., that are immediately rearward of the front-row door openings 130, may be defined by the middle pillars 125 and the rear pillars 125. In other words, the pillars 125 may partially outline and constitute the door openings 130.

The vehicle 100 includes at least one radio receiver 110, e.g., a plurality of radio receivers 110, e.g., one radio receiver 110 for each door 105 and door opening 130. The radio receivers 110 are fixed relative to the body 120 of the vehicle 100, e.g., attached to the respective door openings 130. The radio receivers 110 are configured to receive radio signals from respective tags 140 in the doors 105. The tags 140 may be transmitters, e.g., may be configured to output the radio signals. For example, the radio receivers 110 may be radio frequency identification (RFID) readers, and the tags 140 may be RFID tags. The signal strength of the radio signals may make the radio signals detectable only within a short distance, e.g., approximately three feet, e.g., as a result of being RFID. The short distance can prevent the radio signal from a tag 140 for one door 105 from being read by the radio receiver 110 corresponding to a different door 105. At the same time, the distance is sufficiently great that the radio receiver 110 receives the radio signal from the tag 140 regardless of whether the door 105 is open or closed.

The vehicle 100 may include at least one door sensor 145, e.g., a plurality of door sensors 145, e.g., one door sensor 145 for each door 105 and door opening 130. The door sensors 145 are positioned and configured to indicate whether the respective doors 105 are open or closed. The door sensors 145 may be any suitable type of indicating whether the door 105 is open or closed. For example, the door sensor 145 may be an electrical proximity sensor. For another example, the door sensor 145 may be a spring-loaded switch positioned to be pressed when the door 105 is closed, thereby closing a circuit. If the door 105 is detached from the vehicle 100, the door sensor 145 may indicate that the door 105 is open.

Figure 2:
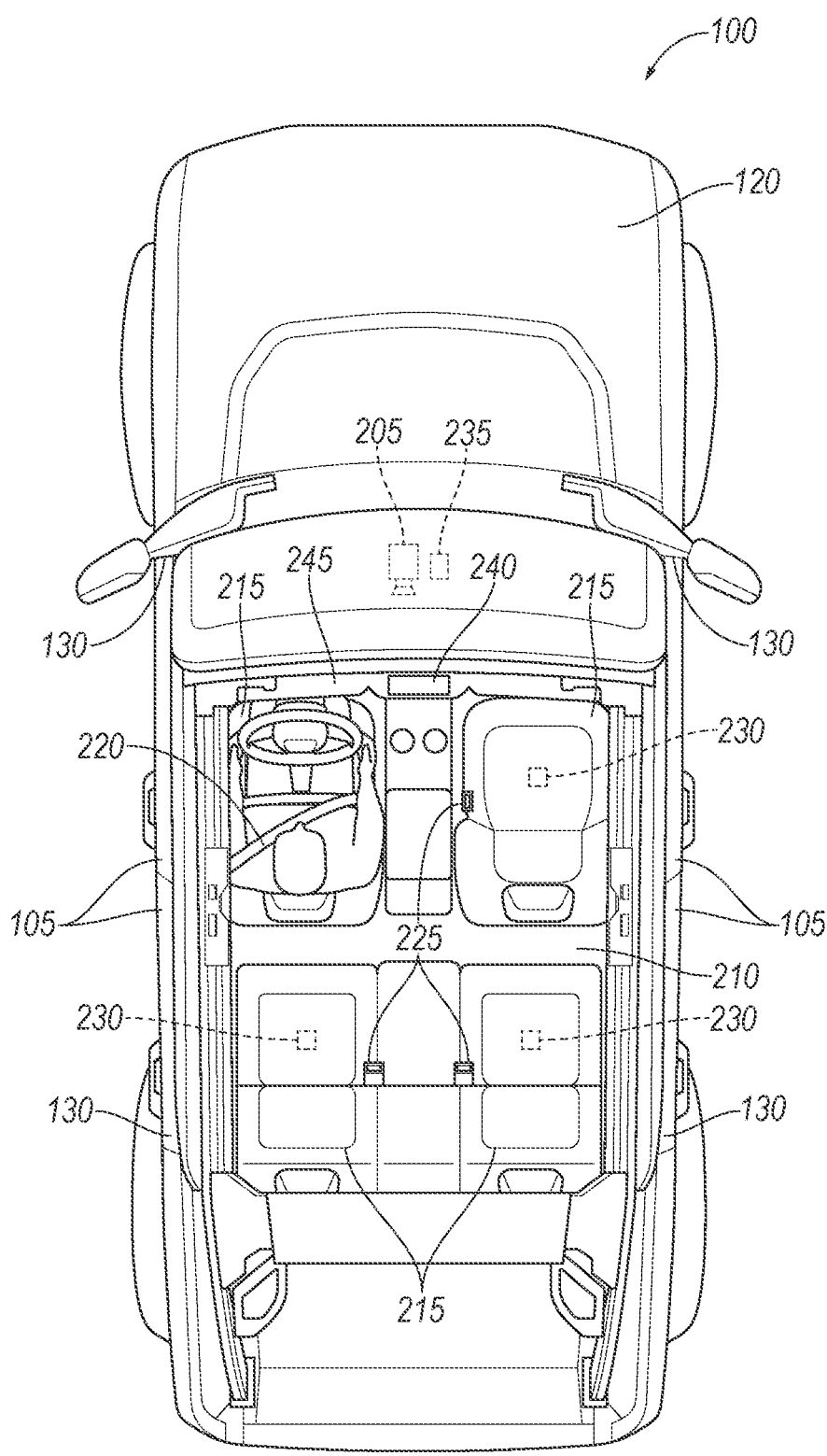
FIG. 2 is a top view of the vehicle with the doors attached.

With reference to FIG. 2, the vehicle 100 includes a passenger cabin 210 to house occupants, if any, of the vehicle 100. The passenger cabin 210 includes one or more seats 215 disposed in a front row of the passenger cabin 210 and one or more of the seats 215 disposed in a second row behind the front row. The passenger cabin 210 may also include seats 215 in a third-row (not shown) at a rear of the passenger cabin 210. The seats 215 are shown to be bucket seats in the front row and bench seats in the second row, but the seats 215 may be other types. The position and orientation of the seats 215 and components thereof may be adjustable by an occupant.

The vehicle 100 includes a plurality of seatbelts 220, e.g., one seatbelt 220 for each seat 215. The seatbelt 220 may be a three-point harness, meaning that webbing is attached at three points around the occupant when buckled: an anchor, a retractor, and a buckle. The seatbelt 220 may, alternatively, include another number and/or arrangement of attachment points. The anchor may attach one end of the webbing to a frame of the seat 215. The other end of the webbing may feed into the retractor, which may include a spool that extends and retracts the webbing. A clip may slide freely along the webbing and, when engaged with the buckle, divide the webbing into a lap band and a shoulder band.

The vehicle 100 includes at least one buckle sensor 225, e.g., one buckle sensor 225 for each seatbelt 220. The buckle sensors 225 indicate whether the respective seatbelt 220 is latched, e.g., whether the clip is engaged with the buckle. The buckle sensor 225 may be any suitable type, e.g., an electrical proximity sensor, an electrical switch positioned to be closed when the seatbelt 220 is latched, etc.

The vehicle 100 includes at least one weight sensor 230, e.g., one weight sensor 230 for each seat 215. The weight sensors 230 indicate respective weights sitting in the respective seats 215. The weight sensor 230 may be any suitable type, e.g., an occupant classification system (OCS), e.g., including a pressure sensor.

The vehicle 100 includes the camera 205. The camera 205 can detect electromagnetic radiation in some range of wavelengths. For example, the camera 205 may detect visible light, infrared radiation, ultraviolet light, or some range of wavelengths including visible, infrared, and/or ultraviolet light. For example, the camera 205 can be a charge-coupled device (CCD), complementary metal oxide semiconductor (CMOS), or any other suitable type. The camera 205 may be fixed relative to the frame 115 and/or body 120 of the vehicle 100. The camera 205 may be positioned inside the passenger cabin 210. The camera 205 may be positioned such that a field of view of the camera 205 encompasses the seats 215, e.g., all the seats 215, and/or the doors 105, e.g., all the doors 105 that are attached.

The vehicle 100 may include a radar 235. The radar 235 transmits radio waves and receives reflections of those radio waves to detect physical objects in the environment. The radar 235 can use direct propagation, i.e., measuring time delays between transmission and reception of radio waves, and/or indirect propagation, i.e., Frequency Modulated Continuous Wave (FMCW) method, i.e., measuring changes in frequency between transmitted and received radio waves. The radar 235 may be fixed relative to the frame 115 and/or body 120 of the vehicle 100. The radar 235 may be positioned inside the passenger cabin 210. The radar 235 may be positioned such that a field of view of the camera 205 encompasses the occupants, if any, of the vehicle 100, e.g., all the locations that would be filled by occupants in the seats 215.

The vehicle 100 may include a user interface 240. The user interface 240 presents information to and receives information from an occupant of the vehicle 100. The user interface 240 may be located, e.g., on an instrument panel in the passenger cabin 210, or wherever may be readily seen by the occupant. The user interface 240 may include dials, digital readouts, screens, speakers, and so on for providing information to the occupant, e.g., human-machine interface (HMI) elements such as are known. The user interface 240 may include buttons, knobs, keypads, microphone, and so on for receiving information from the occupant.

The user interface 240 may include a seatbelt indicator 245. The seatbelt indicator 245 in an actuated state may communicate to occupants of the vehicle 100 that at least one seatbelt 220 is not buckled, and the seatbelt indicator 245 in a not actuated state may communicate to the occupants that the seatbelts 220 for occupied seats 215 are buckled. For example, the seatbelt indicator 245 may include a lamp or light on the instrument panel, and the seatbelt indicator 245 may illuminate upon receiving a command to do so. For another example, the seatbelt indicator 245 may include a screen of the user interface 240, and the screen may display a message indicating that one of the seatbelts 220 is unbuckled upon receiving a command to do so. For another example, the seatbelt indicator 245 may include a speaker that outputs a specific noise or prerecorded message.

Figure 3:
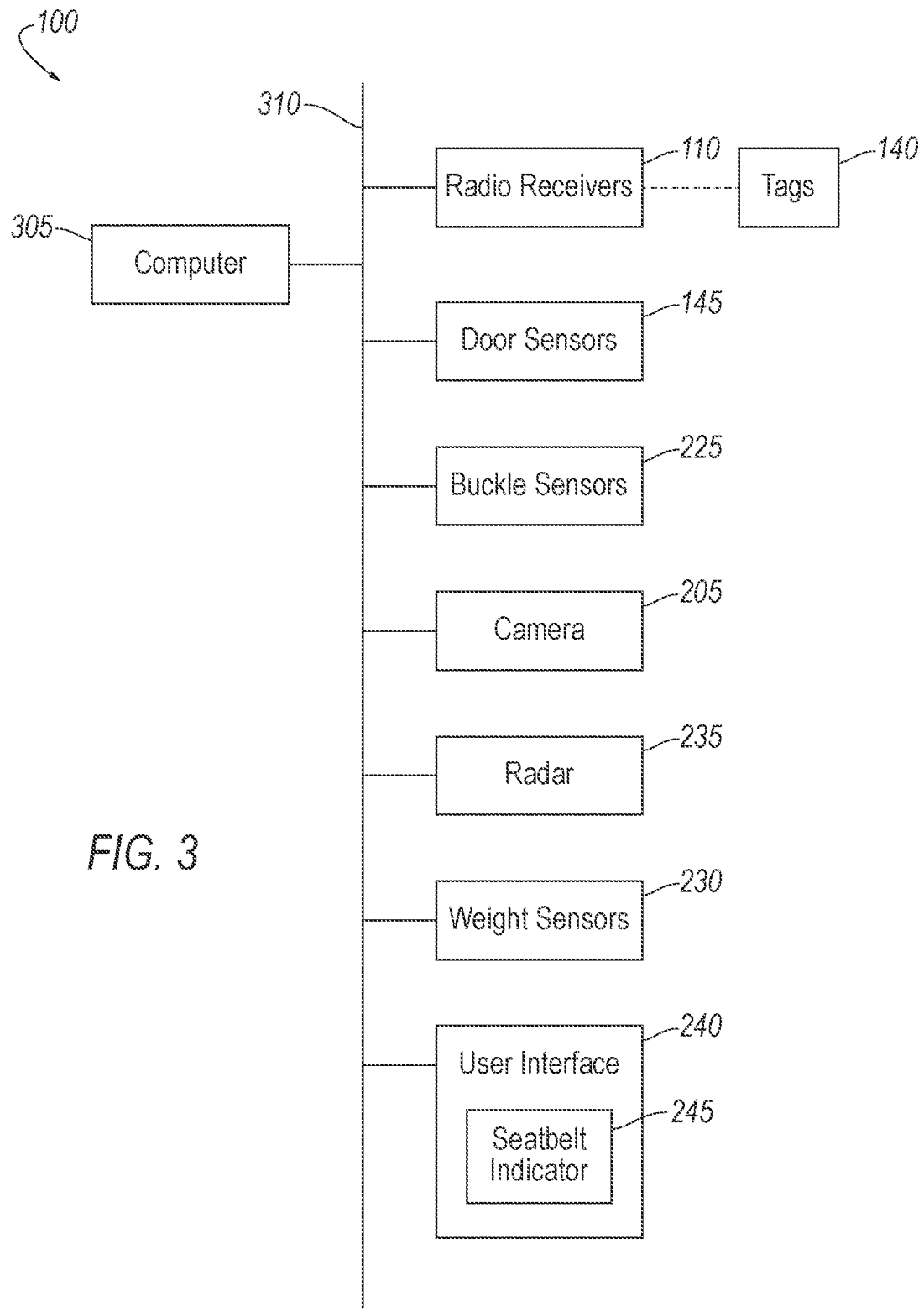
FIG. 3 is a block diagram of the vehicle.

With reference to FIG. 3, the vehicle 100 includes the computer 305. The computer 305 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 305 can thus include a processor, a memory, etc. The memory of the computer 305 can include media for storing instructions executable by the processor as well as for electronically storing data and/or databases, and/or the computer 305 can include structures such as the foregoing by which programming is provided. The computer 305 can be multiple computers coupled together.

The computer 305 may transmit and receive data through a communications network 310 such as a controller area network (CAN) bus, Ethernet, WiFi, Local Interconnect Network (LIN), onboard diagnostics connector (OBD-II), and/or by any other wired or wireless communications network. The computer 305 may be communicatively coupled to the radio receivers 110, the door sensors 145, the buckle sensors 225, the camera 205, the radar 235, the weight sensors 230, the user interface 240, and other components via the communications network 310.

The computer 305 is programmed to determine whether the doors 105 are attached to or detached from the vehicle 100. The computer 305 may determine the status of each door 105 independently. The computer 305 determines whether one of the doors 105 is attached or detached based on data from at least one of the camera 205 or the respective radio receiver 110.

The computer 305 may be programmed to determine whether each door 105 is attached to or detached from the vehicle 100 based on data from the camera 205. For example, the doors 105 may include respective markings that are visible to the camera 205 when the doors 105 are attached. Because the camera 205 is in a fixed location relative to the vehicle 100, the markings are at predetermined locations in image frames returned by the camera 205. The computer 305 may determine whether the image frame at the predetermined locations matches the image data that would be produced by the markings. For each predetermined location, the computer 305 determines that the respective door 105 is attached if the image data at that predetermined location matches the expected image data of the marking, and the computer 305 determines that the respective door 105 is detached otherwise.

For another example, the computer 305 may identify the doors 105 using conventional image-recognition techniques, e.g., a convolutional neural network programmed to accept images as input and output identified objects. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential type of object, and the final output is the type with the highest score. For each predetermined location in the image frame, the computer 305 determines that the respective door 105 is attached if the type for the object in that predetermined location is "door," and the computer 305 determines that the respective door 105 is detached otherwise.

The computer 305 may be programmed to determine whether each door 105 is attached to or detached from the vehicle 100 based on data from the radio receivers 110. The computer 305 may receive data from the radio receivers 110 indicating the presence or absence of the respective tags 140, i.e., whether the respective tags 140 are within range of the radio receivers 110, i.e., whether the radio receivers 110 are receiving the respective radio signals from the respective tags 140. For each door 105, the computer 305 determines that the door 105 is attached to the vehicle 100 if the respective radio receiver 110 indicates that the respective tag 140 is present, and the computer 305 determines that the door 105 is detached from the vehicle 100 if the respective radio receiver 110 indicates that the respective tag 140 is absent.

The computer 305 may be programmed to determine whether any of the seatbelts 220 have been unbuckled and to actuate the seatbelt indicator 245 in response to data indicating any of the seatbelts 220 being unbuckled. The computer 305 may determine that a seatbelt 220 has been unbuckled based on data from the respective buckle sensor 225. For example, the computer 305 may determine that an occupant has unbuckled a previously buckled seatbelt 220 based on receiving data from the buckle sensor 225 indicating that the seatbelt 220 is unbuckled immediately after receiving data from the buckle sensor 225 indicating that the seatbelt 220 is buckled (regardless of data from the weight sensor 230). (The computer 305 may also treat the vehicle 100 starting while one of the seats 215 is occupied and the seatbelt 220 for that seat 215 is unbuckled as that seatbelt 220 being unbuckled.) In response to the data indicating that one of the seatbelts 220 has been unbuckled, the computer 305 actuates the seatbelt indicator 245. For example, the computer 305 may turn on the dashboard light. For another example, the computer 305 may illuminate a screen to output a message stating that one of the seatbelts 220 is unbuckled. For another example, the computer 305 may instruct a speaker to output a chime noise or a prerecorded message stating that one of the seatbelts 220 is unbuckled. The computer 305 may maintain the seatbelt indicator 245 in the actuated state until a reset condition is satisfied, which, as described below, may depend on whether the doors 105 are attached to or detached from the vehicle 100. The computer 305 may, upon the reset condition being satisfied, de-actuate the seatbelt indicator 245, i.e., put the seatbelt indicator 245 into the not actuated state.

The computer 305 is programmed to, upon determining that the doors 105 are attached to the vehicle 100, actuate a component of the vehicle 100 based on data from the door sensors 145. The computer 305 may actuate the component based on data from all the door sensors 145 upon determining that all the doors 105 are attached to the vehicle 100. Alternatively or additionally, the computer 305 may actuate the component based on data from the door sensors 145 for one of the rows of the seats 215 upon determining that both the doors 105 for that row of seats 215 are attached; e.g., the computer 305 may actuate the component based on data from the door sensors 145 for the front doors 105 upon determining that both the front doors 105 are attached, even if one or both of the rear doors 105 are detached, and the computer 305 may actuate the component based on data from the door sensors 145 for the rear doors 105 upon determining that both the rear doors 105 are attached, even if one or both of the front doors 105 are detached.

The component may be the seatbelt indicator 245, and when the doors 105 are attached to the vehicle 100, the reset condition may depend on the door sensors 145. The computer 305 may de-actuate the seatbelt indicator 245 in response to data from the door sensors 145 indicating that one of the doors 105 is open. For example, the computer 305 may de-actuate the seatbelt indicator 245 in response to data from the door sensors 145 indicating that any of the doors 105 is open. For another example, the computer 305 may de-actuate the seatbelt indicator 245 in response to data from the door sensors 145 indicating that one of the doors 105 is open that is in a same row as the seatbelt 220 that has been unbuckled, i.e., the same row as the buckle sensor 225 that produced the data relied upon by the computer 305 to actuate the seatbelt indicator 245. The computer 305 may ignore data from the door sensors 145 in other rows than the row of the seatbelt that has been unbuckled.

The computer 305 is programmed to, upon determining that one of the doors 105 is detached from the vehicle 100, actuate the component without relying on the data from at least one of the door sensors 145. The computer 305 may actuate the component without relying on data from any of the door sensors 145 upon determining that at least one of the doors 105 is detached from the vehicle 100. Alternatively or additionally, the computer 305 may actuate the component without relying on data from the door sensors 145 in a row for which at least one of the doors 105 is detached from the vehicle 100; e.g., the computer 305 may actuate the component without relying on data from the door sensors 145 for the front doors 105 upon determining that at least one of the front doors 105 is detached, and still actuate the component based on data from the door sensors 145 for the rear doors 105 if both rear doors 105 are attached. The computer 305 may be programmed to, upon determining that one of the doors 105 is detached from the vehicle 100, actuate the component based on data from at least one of the camera 205, the radar 235, or the weight sensors 230; i.e., the computer 305 may, upon not relying on data from the door sensors 145 for actuating the component, actuate the component based on data from the camera 205, the radar 235, and/or the weight sensors 230.

The computer 305 may be programmed to actuate the component based on data indicating an occupancy status of the vehicle 100. The occupancy status indicates the occupancy of the vehicle 100. For example, the occupancy status may be a binary variable indicating "occupied" or "unoccupied," may indicate a number of occupants in the vehicle 100, may indicate whether each row of seats 215 is occupied, may indicate whether each seat 215 is occupied, etc. The computer 305 may receive the data indicating the occupancy status from the weight sensors 230. Alternatively or additionally, the computer 305 may receive the data indicating the occupancy status from the camera 205 and/or the radar 235. The computer 305 may determine the occupancy status from image data from the camera 205, e.g., using object recognition or facial detection applied to predetermined locations in the image frame at which occupants of each seat 215 would be located if present. The computer 305 may determine the occupancy status from radar data from the radar 235, e.g., by determining whether predetermined positions in space are filled, the predetermined locations being where occupants of each seat 215 would be positioned if present. As one example, the computer 305 may determine the occupancy status from the weight sensors 230 if the weight sensors 230 indicate that each previously occupied seat 215 is still occupied, and determine the occupancy status from the camera 205 and/or the radar 235 if the weight sensors 230 indicate that at least one of the seats 215 has become unoccupied.

The computer 305 may be programmed to, when the doors 105 are detached, actuate the seatbelt indicator 245 in response to data indicating a seatbelt 220 of the vehicle 100 being unbuckled and data indicating an occupant in a seat 215 paired with the seatbelt 220. In other words, the computer 305 determines that one of the seatbelts 220 has been unbuckled and determines that the occupancy status indicates that the seat 215 for that seatbelt 220 is occupied, e.g., the seatbelt 220 of the front passenger seat 215 has been unfastened and the occupancy status indicates an occupant in the front passenger seat 215.

The computer 305 may be programmed to, when the doors 105 are detached, keep the seatbelt indicator 245 actuated until receiving data indicating a lack of the occupant in the seat 215 paired with the seatbelt 220 that has been unbuckled. The computer 305 may be programmed to de-actuate the seatbelt indicator 245 in response to data indicating a lack of an occupant in the seat 215 paired with the seatbelt 220 that has been unbuckled. In other words, the reset condition when the doors 105 are detached from the vehicle 100 may be that that seat 215 has become unoccupied. For example, if the computer 305 actuated the seatbelt indicator 245 in response to the seatbelt 220 of the front passenger seat 215 being unbuckled, the computer 305 may de-actuate the seatbelt indicator 245 in response to a lack of occupant in the front passenger seat 215.

Figure 4:
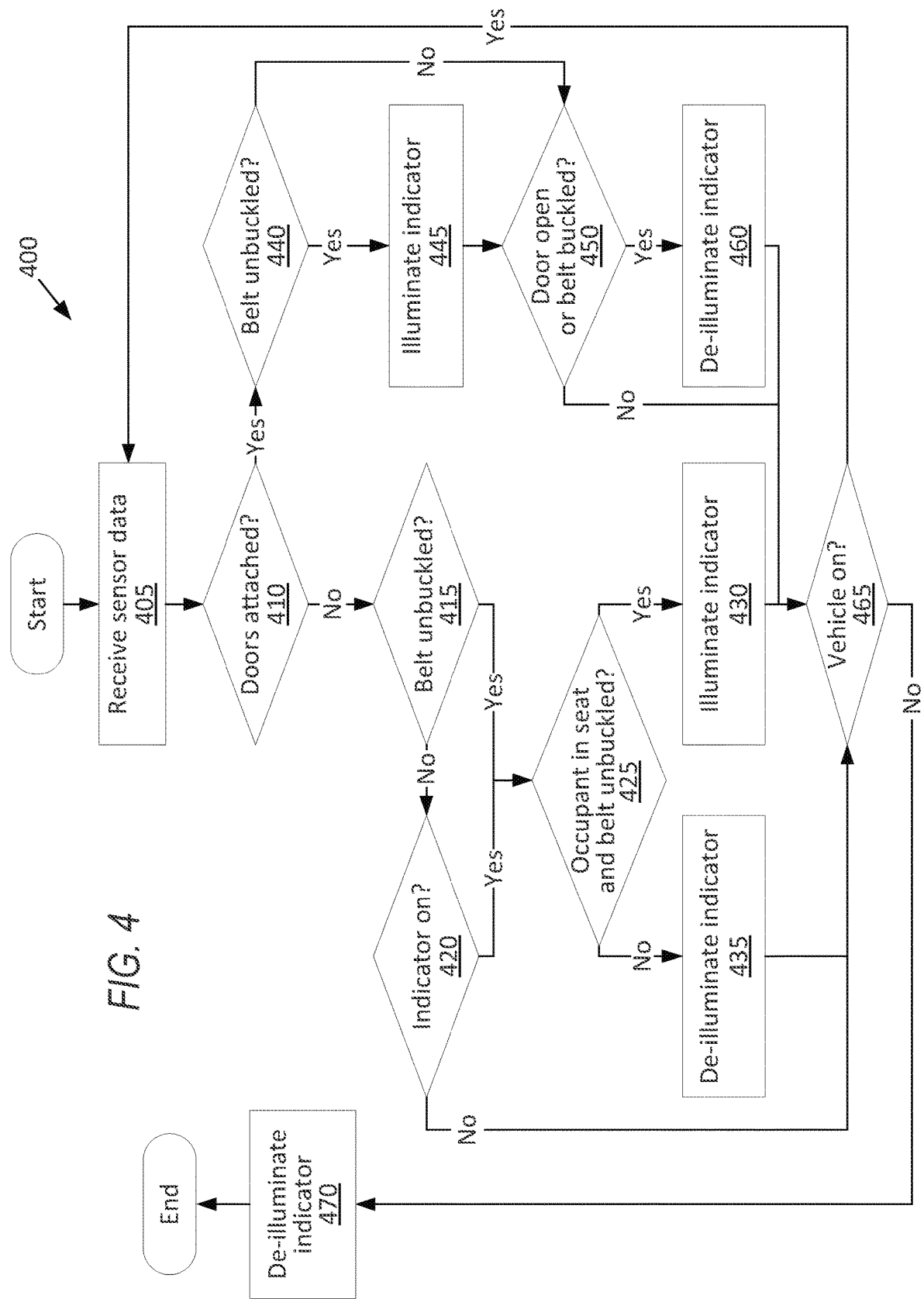
FIG. 4 is a flowchart of an example process for actuating a component of the vehicle based on an attachment status of the doors of the vehicle.

FIG. 4 is a process flow diagram illustrating an example process 400 for actuating the component based on an attachment status of the doors 105. The memory of the computer 305 stores executable instructions for performing the steps of the process 400 and/or programming can be implemented in structures such as mentioned above. As a general overview of the process 400, the computer 305 receives data from the sensors. If the doors 105 are detached, the computer 305 actuates the seatbelt indicator 245 in response to data indicating that a seatbelt 220 has been unbuckled and an occupant is in the seat 215 paired with the unbuckled seatbelt 220 or in response to data indicating that the occupant is in the seat 215 and that the seatbelt indicator 245 is already actuated. The computer 305 de-actuates the seatbelt indicator 245 in response to the seatbelt 220 being buckled or data indicating a lack of the occupant in the seat 215. If the doors 105 are attached, the computer 305 actuates the seatbelt indicator 245 in response to a seatbelt 220 being unbuckled. The computer 305 de-actuates the seatbelt indicator 245 in response to data from the door sensors 145 indicating that a door 105 is open. Regardless of whether the doors 105 are attached or detached, the computer 305 de-actuates the seatbelt indicator 245 once the vehicle 100 turns off.

The process 400 begins in a block 405, in which the computer 305 receives data from the radio receivers 110, the door sensors 145, the buckle sensors 225, the camera 205, the radar 235, and the weight sensors 230.

Next, in a decision block 410, the computer 305 determines whether the doors 105 are attached to or detached from the vehicle 100, as described above. Upon determining that the doors 105 are detached from the vehicle 100, the process 400 proceeds to a decision block 415. Upon determining that at least one door 105 is attached to the vehicle 100, the process 400 proceeds to a decision block 440.

In the decision block 415, the computer 305 determines whether one of the seatbelts 220 has been unbuckled, as described above. In response to data indicating the seatbelt 220 being unbuckled, the process 400 proceeds to a decision block 425. Otherwise, the process 400 proceeds to a decision block 420.

In the decision block 420, the computer 305 determines whether the seatbelt indicator 245 is currently actuated or not actuated. In response to the seatbelt indicator 245 being actuated, the process 400 proceeds to a decision block 425. In response to the seatbelt indicator 245 not being actuated, the process 400 proceeds to a decision block 465.

In the decision block 425, the computer 305 determines whether an occupant is in the seat 215 paired with the unbuckled seatbelt 220, as described above, and whether the seatbelt 220 has been rebuckled. In response to an occupant being in the seat 215 and the seatbelt 220 remaining unbuckled, the process 400 proceeds to the block 430. In response to either a lack of the occupant in the seat 215 or the seatbelt 220 being rebuckled, the process 400 proceeds to a block 435.

In the block 430, the computer 305 actuates the seatbelt indicator 245 or, if already actuated, keeps the seatbelt indicator 245 actuated, as described above. After the block 430, the process 400 proceeds to the decision block 465.

In the block 435, the computer 305 de-actuates the seatbelt indicator 245, as described above. After the block 435, the process 400 proceeds to the decision block 465.

In the decision block 440, the computer 305 determines whether one of the seatbelts 220 has been unbuckled, as described above. In response to data indicating the seatbelt 220 being unbuckled, the process 400 proceeds to a block 445. Otherwise, the process 400 proceeds to a decision block 450.

In the block 445, the computer 305 actuates the seatbelt indicator 245 or, if already actuated, keeps the seatbelt indicator 245 actuated, as described above. After the block 445, the process 400 proceeds to the decision block 450.

In the decision block 450, the computer 305 determines whether one of the doors 105 is open or the seatbelt 220 has been rebuckled. The computer 305 determines whether the door 105 is open based on data from the door sensors 145, as described above. In response to data from the door sensor 145 indicating that the door 105 is open or the seatbelt 220 being rebuckled, the process 400 proceeds to a block 460. In response to the doors 105 remaining closed and the seatbelt 220 remaining unbuckled, the process 400 proceeds to the decision block 465.

In the block 460, the computer 305 de-actuates the seatbelt indicator 245, as described above. After the block 460, the process 400 proceeds to the decision block 465.

In the decision block 465, the computer 305 determines whether the vehicle 100 has been turned off, i.e., is in an off state. For the purposes of this disclosure, "on state" is defined as the state of the vehicle 100 in which full electrical energy is provided to electrical components of the vehicle 100 and the vehicle 100 is ready to be driven, e.g., the engine is running; "off state" is defined as the state of the vehicle 100 in which a low amount of electrical energy is provided to selected electrical components of the vehicle 100, typically used when the vehicle 100 is being stored; and "accessory-power state" is defined as the state of the vehicle 100 in which full electrical energy is provided to more electrical components than in the off state and the vehicle 100 is not ready to be driven. Typically, an occupant puts the vehicle 100 into the on state when the occupant is going to drive the vehicle 100, puts the vehicle 100 into the off state when the occupant is going to leave the vehicle 100, and puts the vehicle 100 into the accessory-power state when the occupant is going to sit in but not drive the vehicle 100. In response to the vehicle 100 turning off, i.e., being in the off state, the process 400 proceeds to a block 470. In response to the vehicle 100 remaining on, e.g., being in the on state or accessory-power state, the process 400 returns to the block 405 to continue monitoring data from the sensors.

In the block 470, the computer 305 de-actuates the seatbelt indicator 245, as described above. After the block 470, the process 400 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:

determine that a door of a vehicle is attached to the vehicle based on data from at least one of a camera of the vehicle or a radio receiver of the vehicle;

upon determining that the door is attached to the vehicle, actuate a component of the vehicle based on data from a door sensor of the vehicle, the door sensor indicating whether the door is open or closed;

determine that the door is detached from the vehicle based on the data from the at least one of the camera or the radio receiver; and upon determining that the door is detached from the vehicle, actuate the component without relying on the data from the door sensor.

2. The computer of claim 1, wherein the instructions further include instructions to determine that the door is attached to the vehicle based on data from the camera, and determine that the door is detached based on data from the camera.

3. The computer of claim 1, wherein the instructions further include instructions to determine that the door is attached to the vehicle based on data from the radio receiver, and determine that the door is detached based on data from the radio receiver.

4. The computer of claim 3, wherein the radio receiver is a radio frequency identification (RFID) reader.

5. The computer of claim 4, wherein the instructions further include instructions to determine that the door is attached to the vehicle in response to data from the RFID reader indicating a presence of an RFID tag of the door, and determine that the door is detached from the vehicle in response to data from the RFID reader indicating an absence of the RFID tag.

6. The computer of claim 1, wherein the component is a seatbelt indicator.

7. The computer of claim 6, wherein the instructions further include instructions to, upon determining that the door is attached to the vehicle, actuate the seatbelt indicator in response to data indicating a seatbelt of the vehicle being unbuckled.

8. The computer of claim 6, wherein the instructions further include instructions to, upon determining that the door is attached to the vehicle, de-actuate the seatbelt indicator in response to data from the door sensor indicating that the door is open.

9. The computer of claim 6, wherein the instructions further include instructions to, upon determining that the door is detached from the vehicle, actuate the seatbelt indicator in response to data indicating a seatbelt of the vehicle being unbuckled.

10. The computer of claim 6, wherein the instructions further include instructions to, upon determining that the door is detached from the vehicle, actuate the seatbelt indicator in response to data indicating a seatbelt of the vehicle being unbuckled and data indicating an occupant in a seat paired with the seatbelt.

11. The computer of claim 10, wherein the instructions further include instructions to, upon determining that the door is detached from the vehicle, keep the seatbelt indicator actuated until receiving data indicating a lack of the occupant in the seat.

12. The computer of claim 6, wherein the instructions further include instructions to, upon determining that the door is detached from the vehicle, de-actuate the seatbelt indicator in response to data indicating a lack of an occupant in a seat.

13. The computer of claim 6, wherein the instructions further include instructions to de-actuate the seatbelt indicator in response to the vehicle turning off.

14. The computer of claim 1, wherein the instructions further include instructions to, upon determining that the door is detached from the vehicle, actuate the component based on data indicating an occupancy status of the vehicle.

15. The computer of claim 14, wherein the instructions further include instructions to receive the data indicating the occupancy status from a weight sensor in a seat of the vehicle.

16. The computer of claim 14, wherein the instructions further include instructions to receive the data indicating the occupancy status from at least one of the camera or a radar of the vehicle.

17. The computer of claim 1, wherein the instructions further include instructions to, upon determining that the door is detached from the vehicle, actuate the component based on data from at least one of the camera or a radar of the vehicle.

18. The computer of claim 17, wherein the instructions further include instructions to, upon determining that the door is detached from the vehicle, actuate the component based on data from the camera.

19. The computer of claim 17, wherein the instructions further include instructions to, upon determining that the door is detached from the vehicle, actuate the component based on data from the radar.

20. A method comprising:

determining that a door of a vehicle is attached to the vehicle based on data from at least one of a camera of the vehicle or a radio receiver of the vehicle;

upon determining that the door is attached to the vehicle, actuating a component of the vehicle based on data from a door sensor of the vehicle, the door sensor indicating whether the door is open or closed;

determining that the door is detached from the vehicle based on the data from the at least one of the camera or the radio receiver; and upon determining that the door is detached from the vehicle, actuating the component without relying on the data from the door sensor.

* * * * *